US012248873B2

(12) United States Patent
Rangarajan et al.

(10) Patent No.: US 12,248,873 B2
(45) Date of Patent: Mar. 11, 2025

(54) COMPUTER-IMPLEMENTED METHOD AND SYSTEM FOR GENERATING A SYNTHETIC TRAINING DATA SET FOR TRAINING A MACHINE LEARNING COMPUTER VISION MODEL

(71) Applicant: VOLKSWAGEN AKTIENGESELLSCHAFT, Wolfsburg (DE)

(72) Inventors: Pooja Rangarajan, Wolfsburg (DE); Nikhil Gupta, Braunschweig (DE); Andre Breitenfeld, Berlin (DE); Andreas Müller, Calberlah (DE); Sebastian Schulz, Uelzen (DE); Sheng Ling, Braunschweig (DE); Thomas Kammerlocher, Calberlah (DE); Fabian Baier, Gehrden (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 489 days.

(21) Appl. No.: 17/804,442

(22) Filed: May 27, 2022

(65) Prior Publication Data

US 2022/0405587 A1 Dec. 22, 2022

(30) Foreign Application Priority Data

Jun. 16, 2021 (EP) ..................................... 21179758

(51) Int. Cl.
*G06N 3/08* (2023.01)
*G06V 10/22* (2022.01)
(Continued)

(52) U.S. Cl.
CPC ............. *G06N 3/08* (2013.01); *G06V 10/235* (2022.01); *G06V 10/771* (2022.01); *G06V 10/82* (2022.01)

(58) Field of Classification Search
CPC ...... G06N 3/08; G06V 10/235; G06V 10/771; G06V 10/82; G06V 10/72; G06V 20/52;
(Continued)

(56) References Cited

U.S. PATENT DOCUMENTS 10,489,683 B1 11/2019 Koh et al.
10,909,349 B1 * 2/2021 Tripathi .................. G06T 19/00
(Continued)

FOREIGN PATENT DOCUMENTS

DE 102008057979 A1 5/2010
WO 2020014286 A1 1/2020
(Continued)

OTHER PUBLICATIONS

AI.Reverie; Synthetic Data Works; originally downloaded prior to Jun. 16, 2021 from https://aireverie.com/; last accessed via Wayback Machine on May 26, 2022.
(Continued)

*Primary Examiner* — Christopher M Brandt
(74) *Attorney, Agent, or Firm* — Barnes & Thornburg LLP

(57) ABSTRACT

A computer-implemented method for generating a synthetic training data set for training a machine learning computer vision model for performing at least one user defined computer vision task, in which spatially resolved sensor data are processed and evaluated with respect to at least one user defined object of interest, including receiving at least one model of a user defined object of interest; determining at least one render parameter and multiple render parameters; generating a set of training images by rendering the at least one model of the object of interest based on the at least one render parameter; generating annotation data for the set of training images with respect to the at least one object of interest; and providing a training data set including the set of
(Continued)

training images and the annotation data for being output to the user and/or for training the computer vision model.

25 Claims, 6 Drawing Sheets

(51) Int. Cl.
*G06V 10/771* (2022.01)
*G06V 10/82* (2022.01)

(58) Field of Classification Search
CPC . G06F 18/214; G06T 3/40; G06T 7/11; G06T 15/005; G06T 15/10; G06T 2207/20084; G05B 13/027
See application file for complete search history.

(56) References Cited

U.S. PATENT DOCUMENTS

| | | | |
|---|---|---|---|
| 2018/0129865 A1 | 5/2018 | Zia et al. | |
| 2018/0129910 A1 | 5/2018 | Zia et al. | |
| 2018/0130229 A1 | 5/2018 | Zia et al. | |
| 2019/0251397 A1 | 8/2019 | Tremblay et al. | |
| 2020/0012846 A1 | 1/2020 | Moravec et al. | |
| 2020/0151963 A1 | 5/2020 | Lee et al. | |
| 2020/0167161 A1 | 5/2020 | Planche et al. | |
| 2020/0356813 A1* | 11/2020 | Sharma | G06V 10/17 |
| 2021/0027444 A1* | 1/2021 | Cheng | G06F 18/2413 |
| 2022/0327322 A1* | 10/2022 | Kandpal | G06V 10/25 |

FOREIGN PATENT DOCUMENTS

| | | | |
|---|---|---|---|
| WO | 2020039121 A1 | 2/2020 | |
| WO | 2020088739 A1 | 5/2020 | |

OTHER PUBLICATIONS

CVEDIA-RT; Introducing CVEDIA-RT; originally downloaded prior to Jun. 16, 2021 from https://www.cvedia.com/; last accessed May 26, 2022.

Google; AI Platform Data Labeling Service; originally downloaded prior to Jun. 16, 2021 from https://cloud.google.com/ai-platform/data-labeling/pricing#labeling_costs; last accessed May 26, 2022.

Hinterstoisser et al.; An Annotation Saved is an Annotation Earned: Using Fully Synthetic Training for Object Detection; 2019 IEEE/CVF International Conference on Computer Vision Workshop (ICCVW); Oct. 27, 2019; pp. 2787-2796.

NVIDIA; NVIDIA Deep learning Dataset Synthesizer (NDDS); originally downloaded prior to Jun. 16, 2021 from https://github.com/NVIDIA/Dataset_Synthesizer; last accessed May 26, 2022.

Scale; Scale Better Data.; originally downloaded prior to Jun. 16, 2021 from https://scale.com/; last accessed May 26, 2022.

Understanding.AI; Why is Automation Essential in Autonomous Driving ?; originally downloaded prior to Jun. 16, 2021 from https://understand.ai/; last accessed May 26, 2022.

Unity; Unity Simulation Pro; originally downloaded prior to Jun. 16, 2021 from https://unity.com/de/products/unity-simulation; last accessed May 26, 2022.

Search Report for European Patent Application No. 21179758.4; Nov. 23, 2021.

Belov et al.; The Use of Synthetic Data for Training the Neural Network to Classify the Aircrafts; 2019 Systems of Signals Generating and Processing in the Field of on Board Communications; IEEE; Mar. 20, 2019; pp. 1-4.

Office Action; European Patent Application No. 21179758.4; Sep. 27, 2024.

* cited by examiner

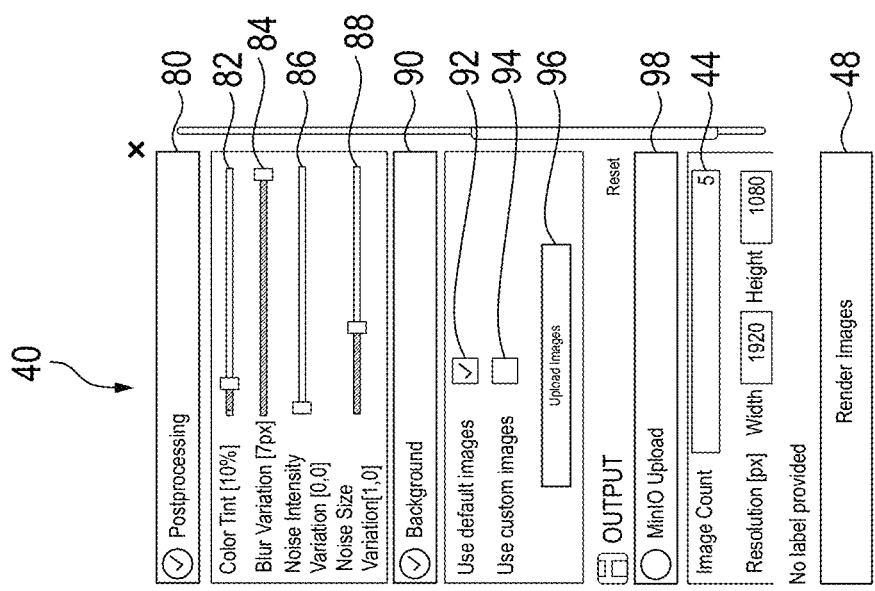
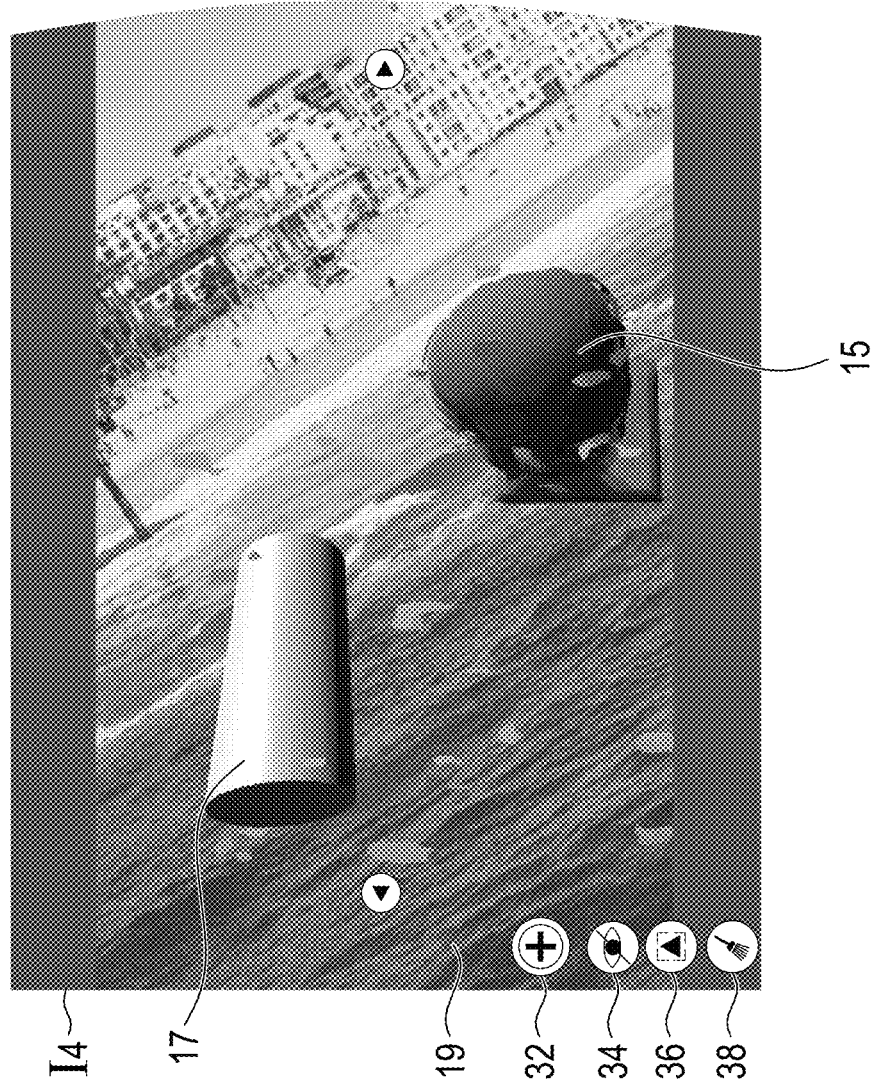
Fig. 5

COMPUTER-IMPLEMENTED METHOD AND SYSTEM FOR GENERATING A SYNTHETIC TRAINING DATA SET FOR TRAINING A MACHINE LEARNING COMPUTER VISION MODEL

PRIORITY CLAIM

This patent application claims priority to European Patent Application No. 21179758.4, filed 16 Jun. 2021, the disclosure of which is incorporated herein by reference in its entirety.

SUMMARY

Illustrative embodiments relate to a computer-implemented method and a system for generating a synthetic training data set for training a machine learning computer vision model.

BRIEF DESCRIPTION OF THE DRAWINGS

Disclosed embodiments will be described with reference to the appended figures. In the figures, like components in different embodiments can exhibit the same reference symbols. The figures show:

FIG. 5 shows the user interface of FIG. 2 with a third user setting; and

DETAILED DESCRIPTION

Figure 1:
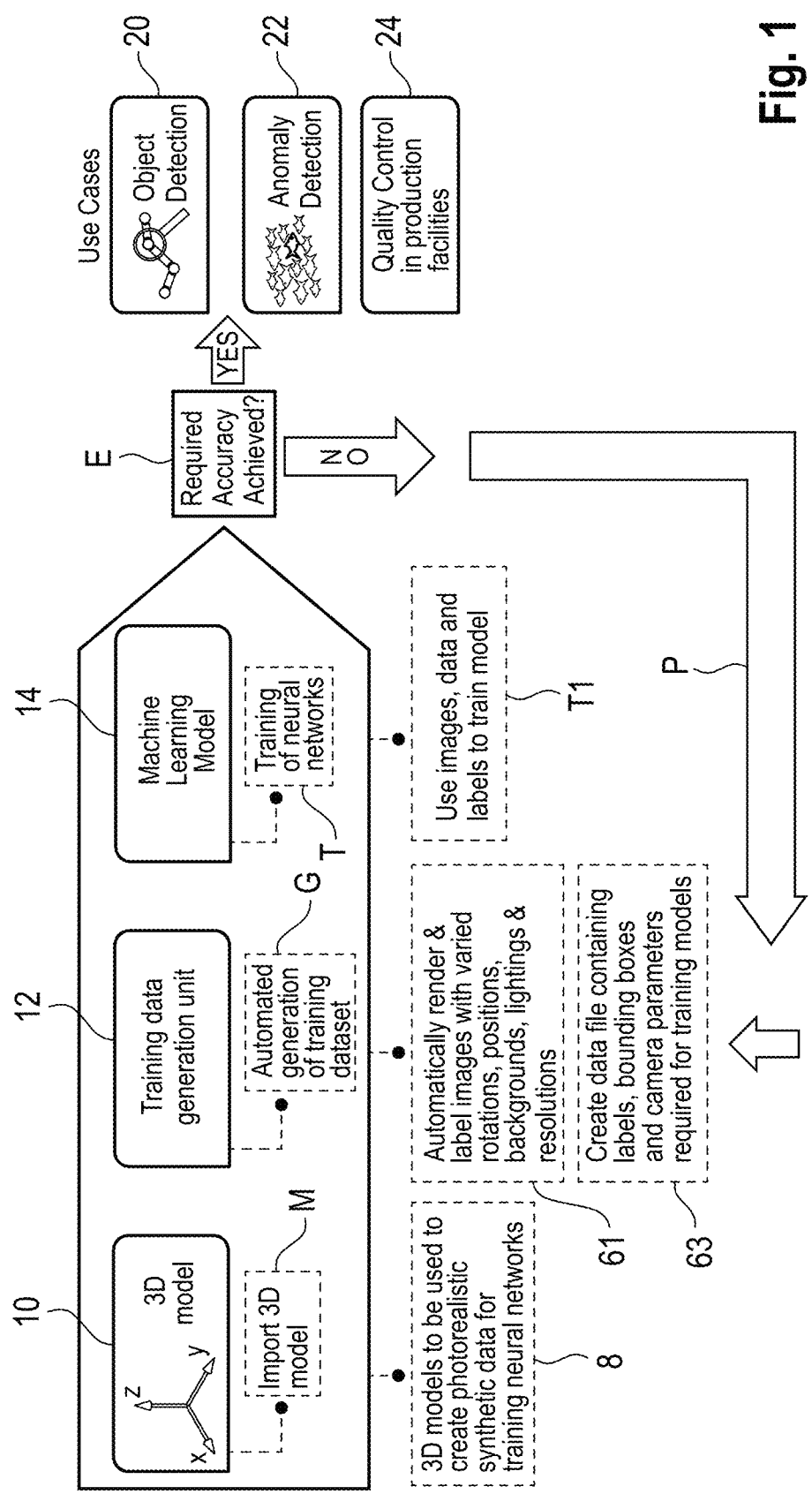
FIG. 1 shows a schematic illustration of a method for generating a synthetic training data set for training a machine learning computer vision model and a method for training a machine learning computer vision model according to an exemplary embodiment.

A number of everyday problems can be solved very quickly by artificial intelligence and machine learning. Be it detection of objects, classification of objects or training robots among many others. Huge amount of time and money is spent only for the process of data generation, data collection and data preparation which involves the process of labelling the data manually. Factors like availability of hardware which include cameras or environmental factors like lights when indoors or weather when outdoors also play an important role. This takes days, weeks or sometimes even months which is then passed on to the computer vision engineers. Computer vision engineers are constantly spending hours working towards generation and collecting massive amounts of data for creating and training neural networks.

Once this data is collected, a computer vision engineer must write a machine learning algorithm to train these images. This requires experience and knowledge in computer vision to write these algorithms and train neural networks. The biggest challenges in this process are time and effort consumption and high requirement and knowledge of writing machine learning algorithms and training neural networks.

The aim is to minimize this time consuming and tedious process while making the process of generating and training neural networks very easy even for individuals who do not have knowledge of computer vision. Therefore alternatives were needed consuming less time and less manual effort while making work with artificial intelligence accessible and easy to use without specialized knowledge in the domain.

Current solutions on the market provide manual labelling of image data. These solutions come from companies like GOOGLE® (retrieved from cloud.google.com), Scale.AI (retrieved from scale.com) or Understand.AI (retrieved from understand.ai). Some companies are also creating synthetic data based on 3D data. For example, AI.Reverie (retrieved from aireverie.com) or CVEDIA (retrieved from cvedia.com) create images based on a 3D virtual environment.

These solutions can create labelled images in a short period of time, but require a modelled 3D environment, which can be time consuming as well. In addition Unity 3D has announced to create a cloud based solution, which takes CAD files and render 2D images, which are labelled as well (see retrieved from unity.com). On the other hand, The Nvidia Dataset Synthesizer is an add-on for the Unreal Engine (retrieved from github.com). It uses the Unreal Studio for rendering of the CAD-Files and in addition to RGB-images it is capable of creating depth maps, segmentation masks and other useful information for machine learning (ML) applications.

The publicly known solutions to train neural networks also include using libraries from GOOGLE® like Tensor flow which simplify the process of writing neural networks and training data. But this still requires knowledge on programming languages like python and is often difficult to use without the knowledge. For common datasets to be used for training, there are quite a few sources providing intensive datasets with images and annotations of commonly required data like geographic data, data of transportation vehicles from sources like KAGGLE®.

The publicly known solutions are manual generation of photographs and time intensive labelling by hand to be used for training of the neural network (for part detection). Writing the algorithm for training a neural network is also a time and effort intensive process. Knowledge and experience in computer vision and neural networks is also required to use the data effectively. Manually taking photographs of 500 images takes over a couple of hours and labelling them manually another days There are some tools to help the labelling process but this still needs manual work to identify objects in an image which does not decrease the time required by a lot. The training process including creation of a neural network and/or writing the algorithm for training a neural network would be another weeks time of work which is great amount of time and effort required to be spent in the whole process.

Even though the shortcoming of the time consuming process of manually generating and clicking images of real objects and labelling them manually has somewhat tried to be reduced by synthetic data generators like NVIDIA data synthesizer, this still needs extensive amount of technical knowledge and experience in computer vision for usage. Other applications built on platforms like Unity and Unreal, also require the user to have additional installations and read up on how to use the platforms and be familiar with tools like Unity/Unreal. These methods are not straightforward and complicated for the user with no prior knowledge to use.

In the end, it costs almost the same amount of time and effort and years of education and knowledge required to do this process.

The easiest process without prior knowledge or skill required would be to generate data by manually clicking photographs. People often tend to write their own tool for the process of labelling either in Matlab, Python, etc. to help speed up the process. People also try to install and learn new platforms like Unity or Unreal which provides some libraries to generate data. But there is no famous easy to use solution where the user can use a very basic user interface to render the desired images and labelled data.

From DE 10 2008 057 979 B4, a learning unit for an object detection system for localization and classification of unknown test objects in an image to be analyzed is known. The learning unit comprises an image generation unit for generating training images of a comparative object by generating a virtual 3D scene via a virtual 3D model of the comparative object in front of virtual background conditions. Each pixel of a generated training image is assigned the corresponding 3D-point in the virtual 3D scene. This assignment is used to select comparative object features.

From US 2020/0167161 A1, a system for generating realistic depth images by enhancing simulated images rendered from a 3D model is known. For that, a rendering engine configured to render noiseless 2.5D images by rendering various poses with respect to a target 3D CAD model is provided. Furthermore, a noise transfer engine configured to apply realistic noise to the noiseless 2.5D images. Moreover, the noise transfer engine is configured to learn noise transfer based on a mapping, by a first generative adversarial network of the noiseless 2.5D images to a real 2.5D scan generated by a targeted sensor. Furthermore, a background transfer engine is provided which is configured to add pseudorealistic scene-dependent backgrounds to the noiseless 2.5D images and which is configured to learn background generation based on a processing of output data of the first generative adversarial network as input data and the corresponding real 2.5D scan as target data.

From U.S. Pat. No. 10,489,683 B1, a system and a method for generating large data sets for training deep learning networks for 3D measurements extraction from images taken using a mobile device camera is known. For that, starting from a single 3D base-mesh model (for example, a human body model generated by a one body scan) plus, for instance, skin augmentation, face augmentation, hair augmentation, and/or multiple virtual background, multiple datasets are generated. Then spatial features from the 3D model as one-dimensional body measurements are extracted. A deep learning network is trained for spatial feature extraction by aggregating the spatial features and the plurality of augmented 2D images.

Disclosed embodiments provide a user-friendly method and a system for generating a synthetic training data set for training a machine learning computer vision model, as well as for providing a trained machine learning computer vision model, which may allow to speed up the process of generating training data and training a machine learning computer vision model for a user even with less expertise or prior knowledge.

The afore-mentioned problems are eliminated by the disclosed embodiments.

A computer-implemented method for automatically, generating a synthetic training data set for training a machine learning computer vision model for performing at least one user defined (in particular, computer-implemented) computer vision task, in which spatially resolved sensor data are processed and evaluated with respect to at least one user defined object of interest, includes receiving (by a processor-based system, which is described in a section below) at least one, in particular, 2D or 3D, model of a user defined object of interest based on user input data (which may be input by at least one user and/or which are received by the system based on user input data input by the at least one user).

In other words, in the at least one user-defined computer vision task, spatially resolved sensor data are processed and evaluated with respect to at least one user defined object of interest. Optionally, the spatially resolved sensor data are provided to be processed and evaluated in the computer vision task. Optionally, the spatially resolved sensor data is generated by at least one sensor device for environment perception, for instance, by a camera. Optionally, the spatially resolved sensor data is or derived from a (in particular, two dimensional) image (which may be captured by a camera. Optionally, the machine learning computer vision model includes a set of trainable parameters.

Optionally, at least one user defines and/or intends to perform the at least one user defined computer vision task, which may be any computer vision task, such as, object detection, object classification, segmentation, anomaly detection, quality control (for instance, in production facilities), pose estimation, target perception task, detecting and/or tracking gestures, and/or a computer vision task in robotics or the like.

The method further includes determining (by the processor-based system) at least one render parameter and may be a plurality of render parameters based on user input data (being input by the user).

The disclosed method further includes automatically generating (by the processor-based system and/or in a computer-implemented method operation) a set of training images by (in particular, automatic) rendering the at least one model of the object of interest based on the at least one render parameter. Optionally, the at least one model of the object of interest is rendered to produce a rendered image of the object of interest. Optionally, the training image comprises the rendered image and a (rendered) background image.

The disclosed method further includes automatically generating (by the processor-based system and/or in a computer-implemented method operation) annotation data for the set of training images with respect to the at least one object of interest. In particular, annotation data is generated for each training image (with respect to each object of interest present in the scene). In particular, for each object of interest present in a scene and/or in the (training image) annotation data is generated (and is provided). Thus, annotation data is present for each object of interest present in the scene.

The disclosed method further includes (in particular, automatically) providing (by the processor-based system and/or in a computer-implemented method operation) a training data set comprising the set of training images and the annotation data for being output to the user and/or for training the computer vision model. Optionally, the training data set serves as input (as training data set) for the training process of the computer vision model.

Optionally, the (generated) training data set is transmitted (by the processor-based system) to a user interface to be output to the user and/or to a (processor based) machine learning unit for training the machine learning computer vision model (for performing the at least one user defined computer vision task). Optionally, the user and/or a machine learning unit gets and/or receives (training) images and/or (annotation) data (files) containing labels, bounding boxes and/or camera parameters.

In particular, the method relates to the generation of photorealistic synthetic data for training a machine learning computer vision model, in particular, for training a (artificial) neural network.

Compared to the conventional way of the prior art, in which the data process is usually time and effort intensive where enormous amounts of time is spent in collecting data manually by taking photographs of the objects from various angles and labelling them manually, the suggested method offers significant benefits. This prior art process usually takes weeks to be completed successfully and then a few days to test the data for training the network for the process of testing the network. After this, the model has still to be tested to check if the data is sufficient to be used for various use cases. If not, data needs to be collected again and the whole cycle has to be repeated, this process needs to be optimized to the maximum extent. For a data scientist, it is also difficult to collect data which is protected and confidential, thus making the process of data collection more difficult.

In contrast, the suggested method of generating synthetic training data provides an optimization of the prior art method. The suggested synthetic data generator tool enables an automated data generation and/or creation process which takes very little human effort and time. This saves more than 90 percent time in the process of data generation, training and testing.

Optionally, the user defined object of interest is defined and/or determined by the at least one user (optionally via a 2D or 3D, model of the object of interest being input and/or being preset by the at least one user).

Receiving at least one, in particular, 2D or 3D, model of a user defined object of interest based on user input data is to be understood as receiving the model via a wired and/or wireless communication connection or network. The receiving event may be locally distanced from the place where the user input data are imported and/or generated and/or input (by the user).

Optionally, the user input data are characteristic for the at least one model of the object of interest. In particular, the model (and a three dimensional structure and/or shape of the object of interest) may be derived (just) from the user input data (without further stored data and/or information with respect to the model). The model may be input by the user and/or transmitted (to the system), for instance, in a CAD (Computer Aided Design) format or the like (as data files of type .glb, .gltf, .obj, .stp, .fbx and/or other data format of other applications for virtual product development). Optionally, the input format for the model is flexible.

Using models as CAD models for training, in particular, for generating training datasets, also helps in achieving a dataset for the neural network or for the machine learning computer vision model which sometimes is difficult to obtain with manual photography.

This synthetic data generator tool is very modular in terms of the type of a 3D model to be imported and can support a wide variety of 3D and 2D data types, thus not limiting the user.

It is, however, conceivable that the method includes providing at least one (2D and/or 3D, in particular, 3D) model (in particular, by the system) and a plurality of, for instance, by accessing a memory device (which may be part of the system) on which the at least one model is stored. In this case, the user is able to select at least one model provided (by the system), optionally from the plurality of models provided (for instance, at least three, optionally at least four, optionally at least five, optionally at least ten, optionally at least 20 models provided and/or stored on a storage device which may be assessed (by the system)). In this case, receiving at least one model of a user defined object of interest based on user input data is initiated by the user selecting at least one of the models provided.

Providing models which are selectable by the user offers the benefit that generic objects of interest which are frequently requested by users, for instance, humans and/or buildings and/or hands (e.g., for detecting gestures) or the like do not have to be constructed by the user but may be selected resulting in a very time efficient way for the user to create user defined training data sets.

Some of the solutions for synthetic data generators available online are quite generic like providing standard common environments like roads or airports for the detection of cars or other transportation vehicles.

Optionally, a plurality of, in particular, 2D or 3D, models of (in particular, pairwise) different user defined objects of interest based on user input data, are determined and/or received (by the system). This offers the benefit that the machine learning computer vision model may be trained with respect to more than one object of interest and thus a more complex environment with more object of interests may be simulated. Optionally, the object of interest is a physical object.

In an exemplary embodiment, the method includes communicating with a user interface, wherein the user interface is configured as user input device for user input data being input by the user with respect to the at least one model, the at least one render parameter and a plurality of render parameters, the training images to be generated, the number of generated training images and/or training images to be output, and/or the annotation data to be generated (for example, which label name is used with respect to a given object of interest to label the training images). Optionally, the user interface is a graphical interface. Optionally, the user input data (being input by the user via the user input device) are stored in a memory device (of the system or which may be accessed by the system). Thus, the label name and/or an image count and the like may be set (by the user and/or based on user input data via the interface).

Providing an easy to use user interface (UI) to automate the process of data collection, generation and training may be done without any experience, extra installation of dependencies, knowledge or degrees required. The user interface is very intuitive and user friendly. With a UI being easy to use it is very easy for everyone to work with artificial intelligence and/or machine learning computer vison models with no special knowledge or set up required. Using this UI, the user can use advanced functionalities of data generation, labelling and neural network training without bothering about what is going on at the backend.

Optionally, the user interface is configured as an output device for outputting and displaying information and/or the generated training data set to the user. Optionally, the user interface is configured to optionally preview the training images (optionally in real time), in particular, to preview the training images that would be rendered in real time according to the at least one render parameter and to the plurality of (set and/or user defined) render parameters (like lighting, rotation, etc.), in particular, the plurality of render parameters that the user is currently setting on the user interface.

Optionally, the method and/or the system is implemented in a distributed computing system that includes a back-end component and/or a front-end component. The back-end component can, for example, be a server, in particular, an external server, on which the computer-implemented method may be carried out. The external server is, for example, a backend of a (for example, transportation vehicle) manufacturer or a service provider. The functions of the backend or the external server may be performed on (external) server farms. The (external) server may be a distributed system. The external server and/or the backend may be cloud-based.

The front-end component can, for example, be a client computer and/or a user terminal, like a tablet or a smartphone, having a graphical user interface, a web browser through which the user can interact (with the back-end component), and/or other graphical user interfaces for a transmitting device. Optionally, the back-end component and/or the external server can be (in particular, securely) hosted in a specific (optionally user defined) region as, for instance, in the European Union.

The user can generate complex datasets and train different kind of objects without having to worry about how it is working in the backend with the UI.

Optionally, the method allows an end to end (training) data generation.

In a further exemplary embodiment, for determining at least one render parameter and a plurality of render parameters based on user input data, the at least one render parameter and the plurality of render parameters is determined randomly taking into account the user input data.

Using the synthetic data generation and training User Interface, makes the process easier and faster providing high amount of randomness and variety in the training data with limited physical and mental effort. This randomization also helps if the parts are placed in a way that was not captured manually by the camera. When using synthetic data using to train a network, randomization makes it possible for the network to learn situations and environments which may not have been captured by human observation. This is because, a large amount of training data with the required data annotation can be generated very quickly in the application and trained. With the suggested solution and an automated pipeline (or system) to train the network (or the machine learning computer vision model), the goal to achieve the process of data rendering and training in one click is realized and thus anyone is enabled to work and use artificial intelligence for varied applications.

The combination of adjusting render parameters to user specific settings while being determined in a random way, results in a relatively fast and highly randomized generation of training data which is adjusted to the intended use of the user of the training data and/or the computer vision task that shall be performed.

Optionally, the user may set (and optionally, it is provided (by the system) to receive user input data with respect to a user setting of) at least one and optionally at least two boundary values for at least one render parameter, optionally for at least two render parameters, optionally for a plurality of render parameters and optionally for all render parameters. Optionally, the method includes determining a random value for the at least one parameter taking into account the at least one (user set) boundary value, respectively. Optionally, the method includes determining a random value within a range defined by at least one boundary value set and/or determined by the user and/or at least two boundary values set and/or determined by the user.

Optionally, the method includes (and/or the system is configured to provide) varying at least one render parameter and a plurality of render parameters with respect to a rotation (of an object of interest) and/or a position (of an object of interest) and/or a background and/or a lighting (for generating the training images and/or annotation data). Optionally, (in a computer implemented method operation) the at least one render parameter and the plurality of render parameters are varied based on the user input data and based on the boundary value(s) (which is or are set by the user). This offers the benefit that rotations, positions, backgrounds, lighting are varied (in a computer-implemented method operation and/or by the processor based system) and based on set render parameters. Optionally, multiple render parameters are variated (in particular, in a computer-implemented method operation and/or by the processor based system).

Optionally, the user interface indicates and/or outputs and/or displays and/or visualizes pre-set (boundary) values for at least one render parameter and for all render parameters which may be determined by user input data.

Optionally, the communication includes exchanging data (receiving data and/or transmitting data), in particular, via a wired and/or wireless and/or via an encrypted communication connection, to provide the user interface (and/or the user input device with data) and/or to receive (user input) data from the user interface and/or the user input device.

Optionally, the method provides a user interface and/or a communication connection and/or a communication method (for exchanging data between the user interface and/or the user and the system and/or the training data generation unit) for a secured import and/or upload of 3D models (of the at least one object of interest) or CAD data (by the user, in particular, via the user interface).

Optionally, the method (and/or the system) provides a user interface and/or a communication connection and/or a communication method (for exchanging data between the user interface and/or the user and the system and/or the training data generation unit) for a secured output of the generated training data set. The method provides a secured generation of (a) training data (set), in particular, for neural networks.

In an exemplary embodiment, for generating the set of training images, at least one background image and a plurality of (custom) background images is determined based on user input data. This offers the benefit that the generation of training data can be adapted by the user even more precisely to an environment in which the locally resolved sensor data are captured which are input in the (intended) computer vision task that shall be performed by the machine learning computer vision model. For instance, if the computer vision task is the surveillance of an indoor area, the user can import at least one or a plurality of indoor images. The training of the machine learning computer vision model is thus optimized by approximating the background images to the real background which is part of the locally resolved sensor data which are captured to perform the (intended) computer vision task.

In a further exemplary embodiment, at least one (custom) background image and a plurality of (custom) background images is received based on user input data, wherein the at least one background image is used for generating at least one training image. Optionally, the method includes providing the possibility for the user to add and/or upload and/or import at least one and a plurality of (custom) images which are used as background image for generating the training images.

In other words, the user has the possibility to upload their own background images as well for certain environments like factories or roads or plain white walls. These environments can be 2D and/or 3D data.

Optionally, the user interface comprises an interaction element which enables a user to import and/or to add at least one background image and/or 3D environment data and a plurality of background images. Optionally, the background images imported and/or added by the user are stored in a memory device and/or a backend-server. Optionally, the training image may be generated based on the background image and/or based on rendering the 3D environment data (in particular, to produce a background part of the training image).

In a further exemplary embodiment, for generating the set of training images, a set of background images is (in particular, randomly) selected from a plurality of background images. Optionally, the set of background images is a set of, in particular, user defined, (custom) background images based on user input data and/or a set of background images added and/or imported by the user.

Optionally, the method includes providing a plurality of, in particular, user-independent, (default) background images which are stored on a memory device (of the system and/or which may be accessed by the system). This offers the benefit that the user can initiate (in particular, automatically) generating a training data set without providing and/or uploading images required. Optionally, the set of training images which is randomly selected is selected based on the plurality of (default) background images.

Optionally, the user may select (via the user interface) whether the set of (randomly) selected background images are selected from the set of, in particular, user defined, (custom) background images (which are uploaded and/or imported by the user) and/or the set of, in particular, user-independent, (default) background images (which are provided by the system).

Optionally, the training images are generated using a set of more than 5, optionally more than 10, optionally more than 100, optionally more than 500, optionally more than 800, optionally more than 1000 and optionally more than 2000 background images. Optionally, a random set of over 2000, in particular, user-independent, (custom) background images are provided.

Optionally, at least one (custom and/or default) background image is used to generate more than one, optionally more than two, optionally more than 5, optionally more than 20, optionally more than 100 training images. For instance, if more training images are rendered than background images are provided, a given background image can be repeatedly used.

Optionally, user defined (custom) background images and user-independent (default) background images are used in the rendered (training) images. This variation makes the training dataset more diverse and thus the trained machine learning computer vision model is more robust with respect to different backgrounds.

It is also conceivable, however, to use only one background image to generate all training images based on this background image. For instance, if the (intended) use takes place in an environment in which the background is always black than only one (black) background image is needed.

Optionally, the user indicates and/or sets the number of (different) background images which are used to generate the training images. This allows to adapt the training data set to the user specific application.

In a further exemplary embodiment, each training image is generated based on a photorealistic background image. Optionally, only photorealistic background images are used. This offers the benefit that the generated training images are closer to the (also photorealistic) reality. This should help with the domain adaption of the mode (from virtual to reality).

In a further exemplary embodiment, the at least one render parameter is selected from a group of render parameters being characteristic for a view of the object of interest, for a field of view of a camera for the rendering process, for a size and/or a zoom range of the object of interest, for an orientation and/or a position of the at least one rendered object of interest within the training image, for a view angel, for a roll of the rendered model and/or for a rotation and/or a translation of the at least one object of interest, for a cropping of the at least one object of interest, for an occlusion of the object of interest, and/or for a number of model instances, and/or the like and/or combinations thereof.

This offers the benefit that the model as well as the view may be adapted very close to the intended user specific training task (and its environment that is captured by a sensor device to produce the locally resolved training images). For instance, by setting the number of model instances rendered in the image the environment may be modelled in a very precise way. For instance, if an environment of a crowded market place is of interest with respect to the (user intended) computer vison task to be performed by the trained machine learning computer vision model, the training result might be closer to reality if more than one model of a human is rendered in the image.

Optionally, more than one, optionally more than two, optionally more than 5, optionally more than 10, and optionally all of the above-mentioned render parameters may be set and/or amended by the user (to generate the training images).

In particular, the field of view sets the field of view of a camera for the rendered images (for instance, in degrees). In particular, a zoom parameter is provided to adjust how close to the camera, the object is rendered. Optionally, a zoom range slider may be displayed by the user interface to visualize the presently set zoom range.

Optionally, a view angle can be controlled by the user (in particular, between) 0-360°. A view angle of zero means that the view angle of the rendered image is always fixed to the side facing the camera versus a view angle of 360° which means that the images are rendered from all around the object. This offers the possibility to adapt the orientation of the at least three dimensional model (defined by the user) of the object of interest with respect to the camera (based on which the image is rendered) to the orientation of the object of interest occurring in reality (with respect to the sensor device capturing the locally resolved sensor data). Thus the user specific application of the computer vision task may be modelled in a more precise way.

Optionally, a roll and a roll angle (of the rendered model) may be controlled (by the user) via the user interface.

Optionally, a cropping parameter being characteristic for a percentage of the model rendered in the images may be controlled (by the user) via the user interface. Optionally, a cropping percentage (for rendering the model) is (randomly) chosen within 0 and the set cropping value.

Optionally, an occlusion parameter which is characteristic for introducing an occlusion effect in the rendered image may be determined (by the user) via the UI.

Ability to set up the render environment with lighting and other environmental conditions for indoor and outdoor environments among many other parameters, thus not affected by weather conditions.

In a further exemplary embodiment, the at least one render parameter is selected from a group of render parameters comprising, a parameter characteristic for a maximum, number of distraction objects, for a lighting condition of the training image, for an illumination of the objects and/or the background in the training image, for a number of light sources, for a variation of light intensity, for a variation of color variation, for the inclusion of shadows, a blur and/or a noise, in particular, for a noise intensity (and/or a noise intensity variation) and/or a noise size (and/or a noise size variation), in the rendered image and/or the training image, and the like and/or combinations thereof.

In a further exemplary embodiment, at least one distraction object, which is randomly selected from a plurality of distraction objects, is included in at least one training image and a plurality of training images. Optionally, for each generation of training image, a random number of distraction objects (between 0 and a maximum value which is or may be set by the user) is determined and the determined random number of distraction objects is rendered (in the training image). In particular, the annotation data are not generated with respect to any of these distraction objects. This offers the benefit that, during the training procedure of the machine learning computer vision model, this model learns to focus on specifics of the at least one object of interest (instead of the randomly occurring distraction objects).

Optionally, the user interface contains more than one option, optionally a lot of (or a plurality of) options for randomizing the render parameters like handling occlusion parameter, addition of distraction objects, custom backgrounds.

Optionally, a random number of light sources (between 1 and a maximum value adjustable and/or set by the user) is rendered.

Optionally, the lighting condition of at least one object of interest and/or of the background image and/or background scene for illumination of the at least one object of interest and/or the background of the training image may be varied and/or adjusted and/or controlled by the user.

Optionally, a random variation of light intensity, which may be controlled by the user via setting a maximum percentage, may be introduced in the training image.

Optionally, a random variation of noise between 0 and a percentage (set by the user) in the rendered images is introduced.

In a further exemplary embodiment, at least one texture parameter being characteristic for the texture of the user defined object of interest is determined and (in particular, the texture) of at least one distraction object to be included in at least one training image is adjusted based on the at least one determined texture parameter. In particular, the visual appearance of at least one distraction object is adjusted to the visual appearance of at least one object of interest and/or (rendered) model of object of interest.

This offers the benefit that, during the training procedure of the machine learning computer vision model, the computer vision model focusses more on the shape and/or the size of the object of interest. This makes the result of the computer vision task more accurate.

Optionally, the generated (training) images include the rendered image and/or a segmentation map(s), and/or UVW maps.

Optionally, the annotation data (which may be annotation XML files for every (training) image) may include at least one parameter being selected from a group of parameters comprising bounding boxes, camera parameters, field of view (FOV), 6DOF values (6 degrees of freedom values), image label and the like and combinations.

Optionally, the user can import one or more 3D models (in the application), in particular, via the user interface, and control each model individually, if required and/or wished by the user.

Optionally, the annotation data are generated based on the user input data. For example, the user may determine by input user data whether a segmentation shall be performed by the system and/or whether a segmentation map shall be output (to the user via the user interface).

The present disclosure is further directed to a computer-implemented method for (in particular, automatically) training a machine learning computer vision model for performing at least one user defined computer vision task, in which spatially resolved sensor data generated by at least one sensor device, in particular for indoor and/or outdoor, environment perception, are processed and evaluated with respect to at least one user defined object of interest, wherein the machine learning computer vision model includes a set of trainable parameters.

According to the disclosed embodiments, the method for training a machine learning computer vision model includes generating a training data set according to the method (for generating a synthetic training data set for training a machine learning computer vision model for performing at least one user defined computer vision task) described above (and/or one of the described embodiments) and/or receiving a training data set generated by this method (for generating a synthetic training data set for training a machine learning computer vision model for performing at least one user defined computer vision task) described above (and/or one of the described embodiments). Optionally, the method includes training the machine learning computer vision model based on the training data set.

Optionally, the method for training includes receiving and/or to get (training) images and/or (training) data files comprising and/or containing labels and/or bounding boxes and/or camera parameters (which have been used for automatically rendering the images).

Optionally, the training of the machine-learning computer vision model includes determining a value for (each of) the trainable parameters of the set of trainable parameters (in particular, in each of the subsequent training operations), wherein these values (optionally the values of all trainable parameters) are determined based on the set training data (generated by the training data generation unit).

It is conceivable that the type of the machine-learning computer vision model is selected based on user input data with respect to the computer vision task to be performed by the machine learning computer vison model.

Optionally, at least one (pre-written) use case specific machine learning computer vision model, in particular, neural network, may be provided to choose from, in particular, with one click, on the UI.

In an exemplary embodiment, at least one user specific use parameter is determined based on user input data, with the at least one use parameter being characteristic for the user defined computer vision task, wherein the machine learning computer vision model is determined based on the user specific use parameter.

Optionally, the machine learning computer vision model is designed as a (artificial) neural network. Optionally, the (artificial) neural network is designed as a deep artificial neural network, in particular, in which the parameterizable processing chain has a plurality of processing layers.

Optionally, the (artificial) neural network is designed as a convolutional neural network (CNN) and/or a recurrent neural network (RNN) and/or a (fast) RCNN (recurrent convolutional neural network).

Optionally, more than 1000, optionally more than 1400, optionally at least 1500, and optionally more than 2000 training images and annotation data are generated and used for training the machine learning computer vision model.

Optionally, mix of real images (captured by a camera) and synthetic generated training images is used for training the machine learning computer vision model. Optionally, at least 800 images (comprising a mix of real images and synthetic training images) are used for training the machine learning computer vision model.

Optionally, the method provides an automated result evaluation.

In a further exemplary embodiment, the method (for training a machine learning computer vision model for performing at least one user defined computer vision task) includes evaluating the computer-implemented vision model trained with the provided training data set and determining an evaluation parameter being characteristic for an accuracy of the computer-implemented vision model.

Optionally, for the determination of the evaluation parameter, a deviation of the output (for a given parameterization) of the machine learning computer vision model, in particular, the neural network, from a ground truth (based on the generated annotation data) is measured (the so-called Loss). The loss function used may be selected in such a way that the parameters depend on it in a differentiable manner. As part of the optimization process, the parameters of the neural network are adapted in each training operation depending on the derivative of the loss (determined on several examples) such that the loss is minimized. These training operations are repeated often until the loss no longer decreases.

In a further exemplary embodiment, the method (for training a machine learning computer vision model for performing at least one user defined computer vision task) includes generating and providing a further set of training data based on the evaluation parameter. In particular, training data are re-generated based on the evaluation parameter. Optionally, the evaluation parameter is compared to a pre-set precision value and/or a precision value which may be set by the user.

Optionally, the training of the machine learning computer vision model is (thus) performed in a closed loop (in particular, until the precision of the machine learning computer vision model which is the evaluation parameter Disclosed embodiments provide a processor-based, system for generating a synthetic training data set for training a machine learning computer vision model for performing at least one user defined computer vision task, in which spatially resolved sensor data are processed and evaluated with respect to at least one user defined object of interest, the system comprising a training data generation unit, which is configured to generate a set of training images by rendering at least one, in particular, 2D or 3D, model of an object of interest based on at least one render parameter and to generate annotation data for the set of training images with respect to the at least one object of interest.

According to the disclosed embodiments, the training data generation unit is configured to receive at least one (in particular, 2D or 3D) model of an object of interest and/or of the (in particular, user defined) object of interest based on user input data.

Optionally, the training data generation unit is configured to use the model of the object of interest received based on user input data for rendering the at least one, in particular, 2D or 3D model of the object of interest (to generate the set of training images) and/or to generate the annotation data for the set of training images. Optionally, the training data generation unit is configured to use the model of the object of interest received based on user input data to generate the synthetic training data set. In particular, the object of interest with respect to which the machine-learning computer vision model processes and evaluates the spatially resolved sensor data, corresponds to and/or is the object for which the training data generation unit received the model of the object of interest based on user input data.

In particular, the system for generating a synthetic training data set and/or the training data generation unit is configured to generate a synthetic training data set (in particular, the set of training images and/or annotation data) with respect to the (model of the object of interest) received (by the training data generation unit). The user defined computer vision task is (at least also) user defined in the sense that the machine-learning computer vision model is trained with the synthetic training data set which is generated by the training data generation unit based on the model of the object of interest received by the training data generation unit.

Furthermore, the training data generation unit is configured to determine the at least one render parameter and a plurality of render parameters based on user input data, and wherein the training data generation unit is configured to provide a training data set comprising the set of training images and the annotation data for being output to the user and/or for training the computer vision model.

Optionally, the system is configured, suitable and/or intended to carry out the above-described method operations in the context of the method for generating a synthetic training data set for training a machine learning computer vision model individually or in combination with each other and/or to carry out the above-described method operations in the context of the method for training a machine learning computer vision model, individually or in combination with each other. Conversely, the methods may be provided with all features described in the context of the system, individually or in combination with each other. Furthermore, the (in particular, processor based) system mentioned in the context of the above-described method may be provided with all features described in the context of the system, individually or in combination with each other.

Optionally, the training data generation unit is configured, suitable and/or to carry out the above-described method operations in the context of the method for generating a synthetic training data set for training a machine learning computer vision model individually or in combination with each other. Conversely, the method and the training data generation unit described in context with this method may be provided with all features described in the context of the training data generation unit, individually or in combination with each other.

Optionally, the system comprises a method or mechanism for providing a user interaction and/or a device for providing a user interaction. For instance, the system may comprise a device for providing a user interface (e.g., enabling the communication with a user interface which may be part of the system or which may be provided by a user terminal).

Optionally, the system comprises, and the user interface, comprises and/or provides an interaction element which is operable by the user. Optionally, by operating the interaction element and/or by inputting data via the user interface, the user may initiate and/or trigger an automatic generation of a (synthetic) training data set and/or an automatic training of a machine learning computer vision model (in particular, via a click and/or at least one click and/or one click).

Optionally, the system comprises a memory device to store the at least one model of the object of interest and the plurality of models of objects of interest and/or (default and/or custom) background images to generate and/or produce the training images. Optionally, the system comprises a memory device to store the generated training images and/or annotation data.

According to the present disclosure, it is suggested also for the system to make it possible to generate data for different types of use cases for object detection, classification or segmentation. Thus, not limiting the user and providing more flexibility with one tool using the UI.

The suggested system provides an easy to use interface and synthetic training data generation system for computer vision. It is an integrated solution with a front end user interface with a computer vision platform for end to end data generation and training in a closed loop. This system enables import of one of more 3D or 2D data which can be used to render images as you like in a very short period of time, with minimal effort, and further also train this data for various use cases in the fields of object classification, detection or segmentation. The system's straightforward and easy to use intuitive UI enables the user to generate and train data without having prior knowledge of data generation. This data is further passed on to the computer vision platform where the user can proceed with training the neural networks within just one click. This whole process of data generation and training can be triggered by the user using the user interface.

The system and the training data generation unit and/or the machine learning unit and/or the synthetic data generator UI can be used in any kind of industry like computer vision, automotive, aerospace, transport, production, robotics, medical, electronics, manufacturing, agriculture, communication, education, pharmaceutical, food industry, health care, entertainment, etc. Since any kind of data can be used by the user, this synthetic data generator tool UI does not limit the user to any particular industry and hence is very flexible.

The present disclosure is further directed to a computer program or computer program product comprising program methods or mechanisms, in particular, a program code, which represents or codes at least the method operations of each of the two disclosed computer-implemented methods (method for generating a synthetic training data set and method for training a machine learning computer vision model) and optionally one of the described embodiments and is designed for execution by a processor device.

The present disclosure is further directed to a data memory on which at least one exemplary embodiment of the disclosed computer program is stored.

FIG. 1 shows a schematic illustration of a method for generating a synthetic training data set for training a machine learning computer vision model and a method for training a machine learning computer vision model according to an exemplary embodiment.

The reference sign M denotes a first operation of the method in which a, here 3D, model 10 is imported, in particular, to a processor-based system and/or to a training data generation unit 12. A user may, for instance, import one or more 3D models 8 to be used (by the system and/or the training data generation unit 12) to create, in particular, photorealistic, synthetic data for training a machine learning computer vision model, here a neural network.

Optionally, the user may import at least one (3D-) model and optionally all (3D-) models that shall be used to generate (photorealistic) synthetic data for training the machine learning computer vision model using a user interface (UI), which may be provided (in particular, by the system and/or the training data generation unit 12) for interaction with the user.

The training data generation unit 12 receives the user input data (or data derived from the user input data) and the (imported) (3D-) model and optionally all (3D-) models imported by the user which are to be used to generate (photorealistic) synthetic data for training the machine learning computer vision model.

The training data generation unit 12 is configured and intended for an automated generation of a training data set, denoted by reference sign G in FIG. 1.

For an automated generation of training dataset (denoted by reference sign G), images are automatically rendered and labelled with varied rotations, positions, backgrounds, lightings and/or resolutions (in particular, by the training data generation unit 12 and/or the system). This operation is denoted by reference sign 61 in FIG. 1.

In method operation denoted by reference sign 63, a data file containing labels, bounding boxes and/or camera parameters required for training machine learning (computer vision) models is created (in particular, by the training data generation unit 12 and/or the system).

Reference sign 14 denotes a machine learning unit (which may be part of the system). The method may include sending the (automatically) generated training data set to the machine learning unit 14 and/or a computer vision platform. Here the training data set may be used for training a machine learning (computer vision) model, for instance, by training a neural network or neural networks (denoted by reference sign T. Optionally, the training data comprise the (via rendering and/or labelling) generated images (see operation at 61) and annotation data and/or the data file containing labels, bounding boxes and/or camera parameters (see operation at 63).

For operation at T of training the neural networks, in particular, the automatically generated images, (annotation) data and labels are used to train the (machine learning computer vision) model, denoted by reference sign T1.

Optionally, an automated result (of the training procedure of the machine learning model) evaluation to check if the desired and/or required accuracy has been reached is provided (in particular, by the system and/or by an evaluation unit E). If not, the data, is automatically regenerated (see arrow P) and trained (by the system and/or the machine learning unit 14) till the user gets the required accuracy and output in the training process, thus supporting a closed cycle with minimal computer vision knowledge and intervention is required.

As far as the required accuracy is achieved, the trained machine learning model is ready for use cases as, for example, object detection 20, (intelligent) robotics, anomaly detection 22 and/or quality control in production facilities 24.

Optionally, the key features of the system are:
Import one or more 2D images and/or 3D models (optionally using the UI)
Generate images and annotation data using the system UI
Send generated data to a computer vision platform (and/or a machine learning unit 14)
Train the data on the computer vision platform (and/or the machine learning unit 14)

Automated result evaluation

Regenerate data, if accuracy is not optimal thus offering an automated closed loop for data generation and training with little or no manual intervention or knowledge in computer vision required.

Figure 2:
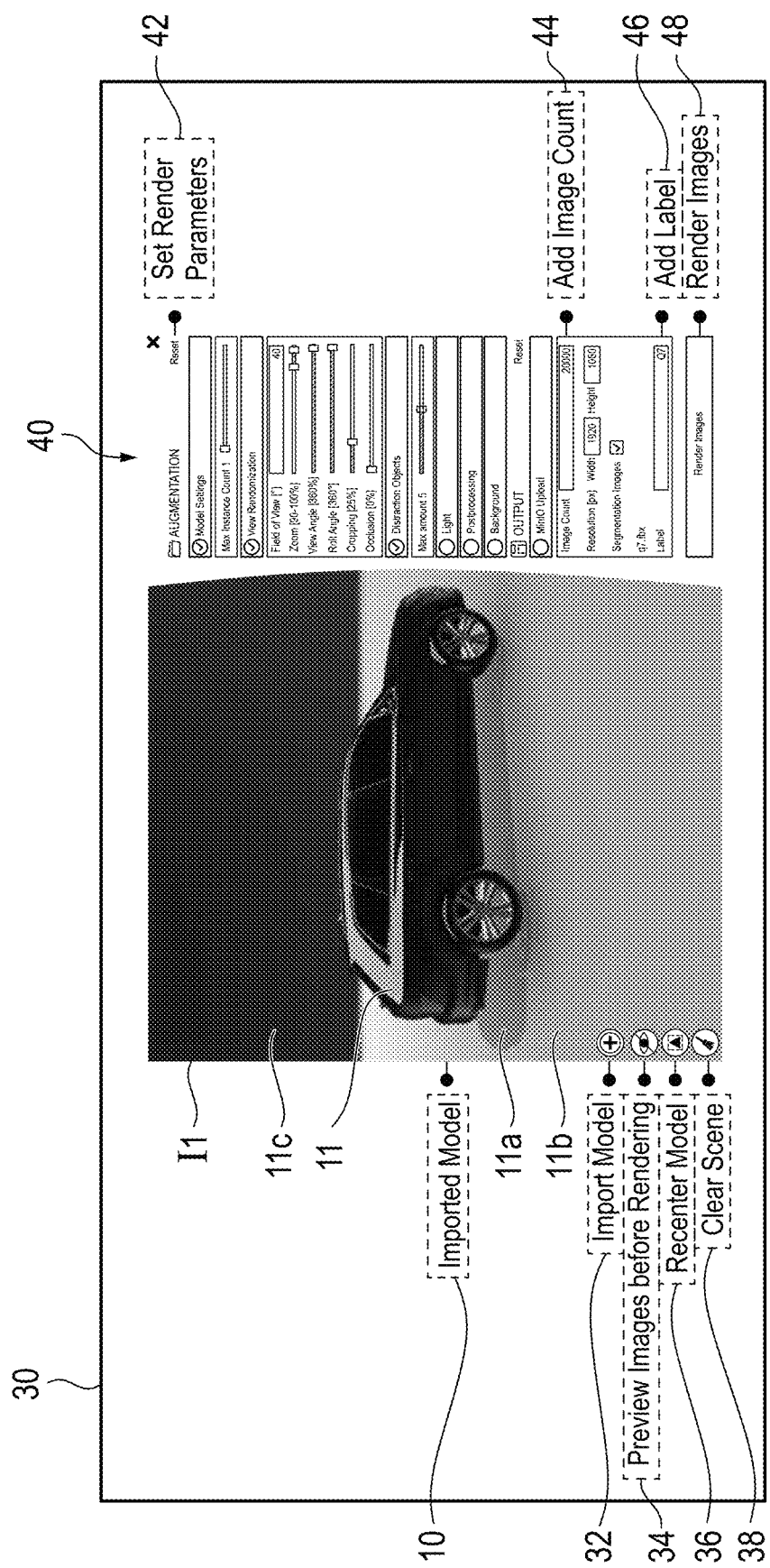
FIG. 2 shows a schematic illustration of a user interface of and/or for a system according to an exemplary embodiment.

FIG. 2 shows a schematic illustration of a user interface 30 of and/or for a system according to an exemplary embodiment. In particular, FIG. 2 shows an example of an easy to use intuitive user interface for interaction with a user (of the method for generating a synthetic training data set for training a machine learning (computer vision) model and/or of the system).

The system may comprise (processor based) methods or mechanisms and/or a (processor based) device for providing a user interface 30. The method and/or the device for providing a user interface 30 is configured to communicate with at least one user interface 30 (and with a plurality of user interfaces 30) and to exchange data with the user interface 30, respectively. The communication may include receiving user input data and transmitting the user input data (or data derived from the user input data), which are input by a user via the user interface 30, to the training data generation unit 12 and/or transmitting data provided by the training data generation unit 12 and/or data from the training data generation unit 12 to at least one user interface 30.

The user interface 30 provides the possibility (see reference sign 32) for the user to interact with the system to, beside others, import a model 10 of an object of interest (defined by the user). The user interface 30 may comprise an output device, for instance, an optical output device as a (visual) display, which provides interaction elements and/or input elements, for instance, graphical objects, (in FIG. 2, for instance, reference signs 32, 34, 36, 38, which may be designed as buttons or the like) by which the user can make an input and/or input user input data which may be transmitted (via the user interface) to the system and/or to the machine learning unit 14.

In particular, the user interface 30 provides an interaction element 32 by which the user can import one or more (3D) models in the application. Furthermore, the user interface provides interaction elements for the user to control each model individually if required.

Furthermore, the user interface 30 shown in FIG. 2, provides an interaction element 34 which allows to preview images before rendering, an interaction element 36 by which a model may be re-centered by the user (with respect to the edges of an image), and an interaction element 38 to clear a scene (for instance, comprising a user defined model and/or a rendered image of the user defined model and/or a background image) displayed to the user.

Furthermore, the user interface 30 may be configured so as to provide a preview and/or a view of the imported model and/or an image before rendering and/or a preview of a rendered image and/or of the training image I1 generated by the system and/or the training data generation unit 12.

This synthetic data generation application also has the possibility to preview the images that would be rendered in real time with the render settings like lighting, rotation, etc. that the user is currently setting on the UI.

The user interface 30 illustrated in FIG. 2 shows as an example a generated training image I1 based on a model 10 of a user defined object, which in this case is a car, wherein the model 10 is imported by the user. The training image I1 comprises a rendered image 11 of the model of the car and a rendered background image (11a-11c). Here, the background image depicts in the lower part of the background image 11b a plane on which the object of interest, here the car, is placed on and in the upper part of the background image 11c a background part of the background image.

Optionally, both the object of interest (here, the car) as well as the background image are rendered based on render parameters. The render parameters may control the lighting condition of the training image which may be seen from the shadows and brighter parts of the rendered model 11 as well as from the shadow 11a of the car in the background image 11b.

Reference sign 40 denotes a user interaction section provided by the user interface 30, by which an augmentation may be controlled by the user, and/or by which the generation of training data and/or an output provided by the system and/or the training data generation unit 12 may be controlled by the user.

For example, for augmentation, the render parameters may be set (and/or reset) by the user, which is denoted by reference sign 42.

The render parameters include different options like number of instances, field of view 56, cropping 64 (see, e.g., FIG. 3), occlusion 66 (see, e.g., FIG. 3), adding distraction objects 68 (see, e.g., FIG. 3), adjusting the lighting conditions 72, post-processing parameters 80 like a color tint 82 in the images (see, e.g., FIG. 5), a noise intensity (variation) 86, a noise size (variation) 88 in the images, the blur 84 in the images (see, e.g., FIG. 5), random set of over 2000 backgrounds images 90 (see, e.g., FIG. 5) and the possibility to add custom images as well.

There is also a possibility to introduce random distraction synthetic objects with similar textures of the imported object in focus. This makes the training of the neural network more robust. To control the randomness of the model rotations in the rendered images for specific use cases like when you only require images of the front portion of the car, this can also be controlled for each individual model imported into the UI.

FIG. 2 illustrates that, here, the user interface 30 visualizes interaction elements for the user to control model settings 50. For example, the user may input a value for the parameter 52 "Max Instance Count" and thereby set a maximum value which gives an upper boundary value for a random number of model instances which are chosen. Setting the parameter "Max Instance Count" results in that a random number of model instances between 1 and the set maximum value is rendered.

Furthermore, for augmentation, parameters may be set by the user with respect to a view randomization 54 and/or with respect to distraction objects and/or with respect to light and/or with respect to post-processing and/or with respect to the background.

On setting the render parameters, there is further an output section available to enter the number of images required to be rendered, the required image resolution and the label for the data. There is also an option for generation of segmentation images and UVW maps which help in application like robotics and pose estimation.

Moreover, the user interface 30 provides an interaction and/or input element by which the user can control and/or set and/or enter the image count. This is denoted by reference sign 44.

Reference sign 46 denotes an interaction element by which the user may add a label, and may input an expression or a sign or a name that shall be used as label (for a given and/or specific object of interest).

Furthermore, the user interface 30 illustrated in FIG. 2 provides an interaction element and/or an input element 48 allowing the user to initiate that the images are (automatically) rendered (by the system and/or the training data generation unit 12.

After the images and annotation file has been generated, this data is passed on to the computer vision platform where the user can use the UI to choose from various application like detection, segmentation, classification, etc. (and/or the data is passed on to a machine learning unit 14). This can be done with a simple drop down menu and the training is started, making it very easy for even a non-technical person to generate data, label it and start a training in minimal time and minimal efforts using the synthetic data generator tool UI.

FIG. 3-6 show the user interface 30 from FIG. 2 with different user settings, for example, for a different object of interests and/or different (render) parameters set by the user. Identical reference signs refer to elements that are technically identical or have the same effect.

Figure 3:
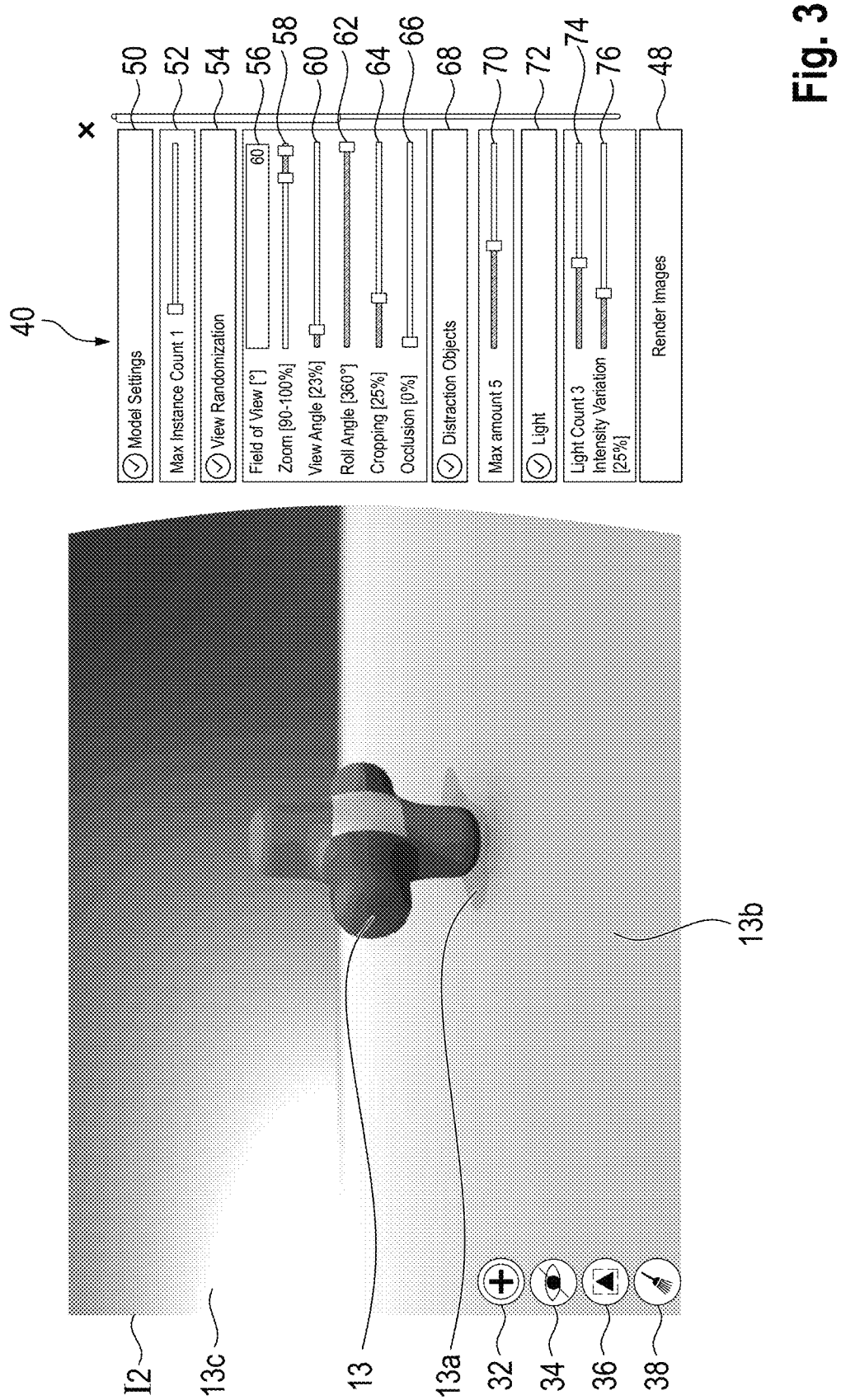
FIG. 3 shows the user interface of FIG. 2 with a first user setting.

FIG. 3 illustrates a feature provided by the system (and/or the method and/or the device for providing a user interface) which provides the possibility (for the user) to control the roll and pitch of the model in the rendered images 12, if the user wants to capture the object only from certain angles for training.

Here, for the object of interest a three-dimensional object with a cross shape is used. Reference sign 13 denotes a rendered model of this object of interest. Here, 3 light sources are set by the user (see reference sign 74) with an intensity variation of 25% (see reference sign 75). These chosen lighting condition results in the shadow 13a in the background section 13b and the brightness variation in the upper background section 13c.

Figure 4:
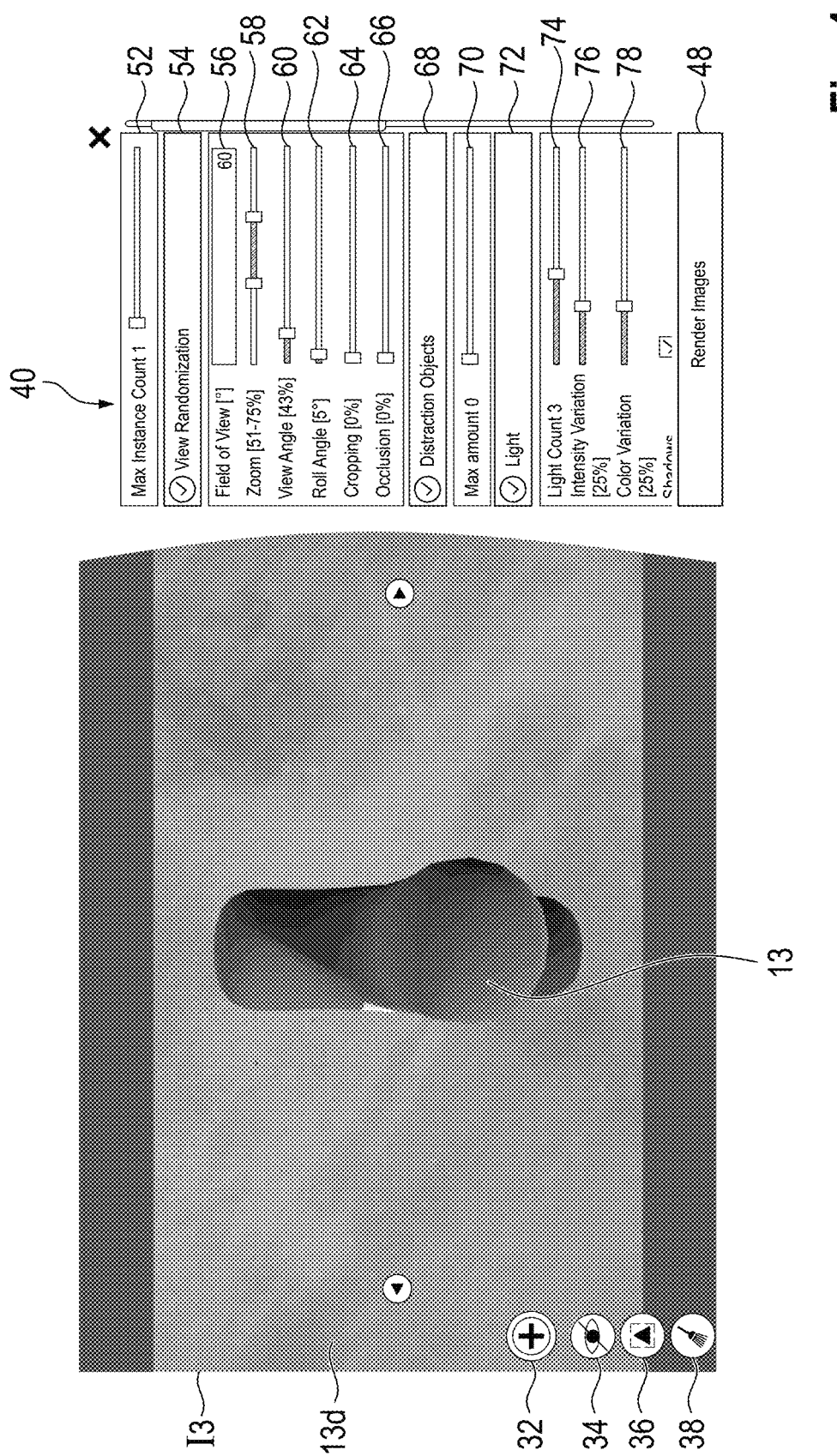
FIG. 4 shows the user interface of FIG. 2 with a second user setting.

As may be seen from a comparison of FIG. 3 with FIG. 4, in which the same model is rendered but with different render parameters, the zoom parameter 58 is set to the range 90-100% according to the user settings illustrated in FIG. 3, while the zoom parameter 58 according to the user settings depicted in the user interface 30 illustrated in FIG. 4, are set to a different range 51-57%.

Here, a given zoom value defines how close to the camera, the object is rendered. If smaller sized models are required in the rendered images, reduce the zoom range. In particular, a maximum zoom range of 90-100% is possible.

Furthermore, as may be seen from a comparison of FIGS. 3 and 4, in the user settings entered in the user interface 30 of FIG. 3, the roll angle 62 is with its value of 360° larger in the settings of FIG. 3 compared to the roll angle 62 of 5° in FIG. 4, while the input value for the view angle 60 is less in FIG. 3 (23°) compared to FIG. 4 (43°).

A user input for the roll angle 62 allows the user to control the roll of the rendered model between 0 and 360°.

Optionally, a view angle 60 can be controlled between 0-360° (via user input by the user). A view angle 60 of zero means that the view angle of the rendered image is always fixed to the side facing the camera. A view angle 60 of 360° means that images are rendered from all around the object (of interest).

As may be seen, for example, from FIG. 4, the user interface illustrated here (as in the other FIGS. 2, 3, 5, 6) visualizes the feature (provided by the system and/or provided by a method and/or a device for providing a user interface) to add and control the number or amount 70 of textured distraction objects in the user interface. Reference sign 68 denotes a parameter which may be selected to add distraction objects.

Distraction objects 17 (see FIG. 5) enable to provide a randomness to the dataset. The suggested method and/or system for generating a synthetic training data set may have the capacity to add a random number of distraction objects with textures similar to the loaded model to the rendered parameter set depending on the set maximum number input value 70 for the number of distraction objects required.

FIG. 5 illustrates another feature of the system and/or the method for generating a synthetic training data set, namely to have custom backgrounds, denoted by reference sign 92 and random backgrounds (with the UI). Reference sign 90 denotes a section of the interaction section 40, in which the user may set parameters with respect to the background 19 of the rendered model 15 of an object of interest (here a flight helmet) in the training image 14.

Optionally, a large collection of inbuilt background images are provided (optionally by the system and/or the training data generation unit 12), which are chosen randomly for the entire dataset. The option for the user to use custom images is denoted by reference sign 94. Optionally, the user has the ability to upload own custom backgrounds for the rendering dataset. The interaction element provided for uploading images is denoted by reference sign 96.

Figure 6:
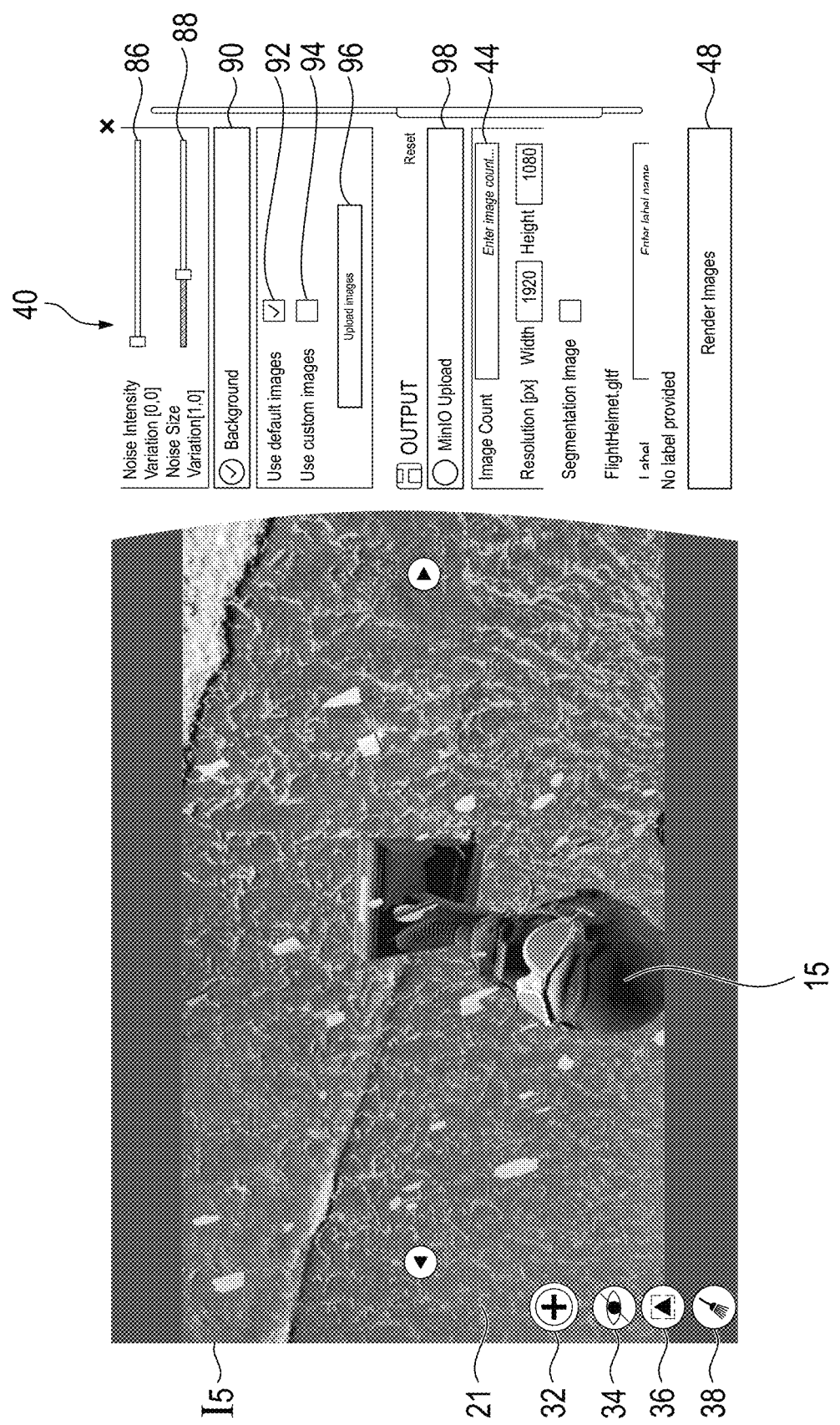
FIG. 6 shows the user interface of FIG. 2 with a fourth user setting.

FIG. 6 shows a training image I5 generated by the system and/or the method for generating a synthetic training data set and/or the training data generation unit 12 for which a different background image is (in particular, randomly) chosen (from the large collection of inbuilt background images) as background 21 compared to the training image 14 (see background 19).

As in FIG. 5, the generated training image which is displayed in the preview mode of the UI comprises a rendered model of the same object of interest (a flight helmet), however with different roll and pitch parameters.

Here, no distraction object is included in the resulting training image I5 (in contrast to the resulting training image 14 in FIG. 5).

The user has the ability to enter the number 44 of images and annotation files required for the training, the required image resolution and also the label to be used (see also reference sign 46 in FIG. 2).

The applicant reserves his right to claim all features disclosed in the application document as being an essential feature of the disclosed embodiments, as long as they are new, individually or in combination, in view of the prior art. Furthermore, it is noted that, in the figures, features are described, which can be used individually. Someone skilled in the art will directly recognize that a specific feature being disclosed in a figure can be beneficial also without the adoption of further features from this figure. Furthermore, someone skilled in the art will recognize that benefits can evolve from a combination of diverse features being disclosed in one or various figures.

LIST OF REFERENCE SYMBOLS

10 Model
8 3D models to be used for training data generation
11, 13 Rendered model of object of interest
11a, 13a shadow
11b, c, 13a, b Background section
13d Background
12 Training data generation unit
13a shadow
14 Machine learning unit
15 Rendered model of object of interest
17 Distraction object
19 Background of training image
20 Object detection 21 background
22 Anomaly detection
24 Quality control in production facilities
30 User Interface
32, 34, 36, 38, Interaction element, input element
44, 46, 48
40 Interaction section
50 Model settings
52 Max Instance Count
54 View Randomization
56 Field of View
58 Zoom parameter
60 View angle
61 Operation of rendering and labelling images
62 Roll angle
63 Creation of data file
64, 66, 68 parameters
70 Amount of distraction object
72 Lighting condition
74 Number of light sources
76 Light intensity
80, 82, 84, Post-processing parameters
86, 88
90 Background
92 Use default images
94 Use custom images
96 Upload images
E Evaluation unit
G Automated generation of a training data set
I1-I5 rendered image, training image
M Operation of importing a model
P arrow
T Training neural networks
T1 Use of images, annotation date for training

The invention claimed is:

1. A system for generating a synthetic training data set for training a machine learning computer vision model for performing at least one user defined computer vision task, in which spatially resolved sensor data are processed and evaluated with respect to at least one user defined object of interest, the system comprising:
   a user interface configured to provide a user input device for user input data being input by a user with respect to at least one model of an object of interest;
   a training data generation unit configured to:
      determine a plurality of render parameters based on user input data, wherein the user input data sets a plurality of boundary values for at least one of the plurality of render parameters,
      generate a set of training images by rendering the at least one model of the object of interest based on the at least one render parameter, and
      generate annotation data for the set of training images with respect to the at least one object of interest,
   wherein the training data generation unit receives the at least one model of the user defined object of interest based on user input data received via the user interface,
   wherein the training data generation unit determines the at least one render parameter which is included in a plurality of render parameters determined by the training data generation unit based on user input data received via the user interface, and
   wherein the training data generation unit provides a training data set comprising the set of training images and the annotation data for output to the user and/or for training the computer vision model.

2. The system of claim 1, wherein the user interface is further configured to provide user input data being input by the user with respect to the at least one render parameter included in the plurality of render parameters to generate the set of training images and/or the annotation data.

3. The system of claim 1, wherein the plurality of render parameters are determined by the training data generation unit randomly taking into account the user input data.

4. The system of claim 1, wherein, the training data generation unit generates the set of training images based on a plurality of background images determined based on user input data.

5. The system of claim 4, wherein at least one background image of the plurality of background images is used for generating at least one training image.

6. The system of claim 1, wherein, the generation of the set of training images is based on a set of background images randomly selected from the plurality of background images.

7. The system of claim 1, wherein each training image of the set of training images is generated based on a photorealistic background image.

8. The system of claim 1, wherein the at least one render parameter of the plurality of render parameters is selected from a group of render parameters characteristic of a view of the object of interest, a field of view of a camera for the rendering process, a size and/or a zoom range of the object of interest, an orientation and/or a position of the at least one rendered object of interest within the training image, a view angle, a roll of the rendered model and/or a rotation and/or a translation of the at least one object of interest, a cropping of the at least one object of interest, an occlusion of the object of interest, and/or a number of model instances, and/or combinations thereof.

9. The system of claim 1, wherein the at least one render parameter of the plurality of render parameters is selected from a parameter characteristic for a maximum, a number of distraction objects, a lighting condition of the training image, an illumination of the objects and/or the background in the training image, a number of light sources, for a variation of light intensity, a variation of color variation, inclusion of shadows, a blur and/or a noise for a noise intensity and/or a noise size variation, in the rendered image and/or the training image, and/or combinations thereof.

10. The system of claim 1, wherein at least one distraction object which is randomly selected from a plurality of distraction objects, is included in at least one training image of the plurality of training images.

11. The system of claim 1, wherein at least one texture parameter is characteristic of the texture of the user defined object of interest is determined and wherein at least one distraction object to be included in at least one training image is adjusted based on the at least one determined texture parameter.

12. A computer-implemented method for generating a synthetic training data set for training a machine learning computer vision model for performing at least one user defined computer vision task, in which spatially resolved sensor data are processed and evaluated with respect to at least one user defined object of interest, the method comprising:
   receiving at least one model of a user defined object of interest based on user input data received via a user interface configured to provide a user input device for the user input data being input by a user with respect to at least one model of an object of interest;

determining a plurality of render parameters based on user input, wherein the user input data sets a plurality of boundary values for at least one of the plurality of render parameters;

generating a set of training images by rendering the at least one model of the object of interest based on at least one render parameter of the plurality of render parameters;

generating annotation data for the set of training images with respect to the at least one object of interest, wherein the at least one model of the user defined object of interest is received based on the user input data received via the user interface, and wherein the at least one render parameter which is included in a plurality of render parameters is based on user input data received via the user interface; and providing a training data set comprising the set of training images and the annotation data for being output to the user and/or for training the computer vision model.

13. The method of claim 12, further comprising communicating with the user interface for user input data input by the user with respect to the at least one render parameter included in the plurality of render parameters to generate the set of training images, and/or the annotation data to be generated.

14. The method of claim 12, wherein the at least one render parameter of the plurality of render parameters is determined based on user input data by randomly taking into account the user input data.

15. The method of claim 12, wherein, the training data generation unit generates the set of training images based on a plurality of background images determined based on user input data.

16. The method of claim 15, wherein at least one background image of the plurality of background images is used for generating at least one training image.

17. The method of claim 12, wherein, the generation of the set of training images is based a set of background images randomly selected from the plurality of background images.

18. The method of claim 12, wherein each training image of the set of training images is generated based on a photorealistic background image.

19. The method of claim 12, wherein the at least one render parameter of the plurality of render parameters is selected from a group of render parameters being characteristic of a view of the object of interest, a field of view of a camera for the rendering process, a size and/or a zoom range of the object of interest, an orientation and/or a position of the at least one rendered object of interest within the training image, a view angle, a roll of the rendered model and/or for a rotation and/or a translation of the at least one object of interest, a cropping of the at least one object of interest, an occlusion of the object of interest, and/or a number of model instances, and/or combinations thereof.

20. The method of claim 12, wherein the at least one render parameter of the plurality of render parameters is selected from a parameter characteristic for a maximum, a number of distraction objects, a lighting condition of the training image, an illumination of the objects and/or the background in the training image, for a number of light sources, for a variation of light intensity, for a variation of color variation, inclusion of shadows, a blur and/or a noise for a noise intensity and/or a noise size variation, in the rendered image and/or the training image, and/or combinations thereof.

21. The method of claim 12, wherein at least one distraction object which is randomly selected from a plurality of distraction objects, is included in at least one training image of the plurality of training images.

22. The method of claim 12, further comprising determining at least one texture parameter is characteristic of the texture of the user defined object of interest and adjusting at least one distraction object to be included in at least one training image based on the at least one determined texture parameter.

23. A computer-implemented method for training a machine learning computer vision model for performing at least one user defined computer vision task, in which spatially resolved sensor data generated by at least one sensor device are processed and evaluated with respect to at least one user defined object of interest, wherein the machine learning computer vision model includes a set of trainable parameters, wherein the method further comprises generating a training data set according to claim 2 and training the machine learning computer vision model based on the training data set.

24. The method of claim 23, further comprising evaluating the computer-implemented vision model trained with the provided training data set and determining an evaluation parameter being characteristic for an accuracy of the computer-implemented vision model.

25. The method of claim 23, further comprising generating and providing a further set of training data based on the evaluation parameter.

* * * * *